United States Patent
Dunford et al.

(10) Patent No.: US 6,677,469 B1
(45) Date of Patent: Jan. 13, 2004

(54) SUPERCRITICAL FLUID FRACTIONATION PROCESS FOR PHYTOSTEROL ESTER ENRICHMENT VEGETABLE OILS

(75) Inventors: Nurhan T. Dunford, Stillwater, OK (US); Jerry W. King, Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/294,166

(22) Filed: Nov. 14, 2002

Related U.S. Application Data
(60) Provisional application No. 60/338,738, filed on Dec. 4, 2001.

(51) Int. Cl.$^7$ .............................................. C11C 7/00
(52) U.S. Cl. ..................................................... 554/205
(58) Field of Search ......................................... 554/205

(56) References Cited

PUBLICATIONS

S.L. Taylor et al., Enrichment and Fractionation of Phospholipid Concentrates by Supercritical Fluid Extraction and Chromatography, Ital. J. Food Sci. N. 1, vol. 12, 2000.

Jerry W. King et al., Production of Tocopherol Concentrates by Supercritical Fluid Extraction and Chromatography, Separation Science and Technology, 31(13), pp. 1843–1857, 1996.

Jerry W. King et al., Phytosterol–Enriched Triglyceride Fractions from Vegetable Oil Deodorizer Distillates Utilizing Supercritical Fluid Fractionation Technology, Separation Science and Technology, 37(2), 451–462 (2002).

Zhimin Xu et al., Comparison of Supercritical Fluid and Solvent Extraction Methods in Extracting γ–Oryzanol from Rice Bran, JAOCS, vol. 77, No. 5 (2000).

N.T. Dunford et al., Phytosterol Enrichment of Rice Bran Oil by a Supercritical Carbon Dioxide Fractionation Technique, Journal of Food Science, vol. 65, No. 8, 2000.

Nurhan Turgut Dunford et al., Thermal Gradient Deacidification of Crude Rice Bran Oil Utilizing Supercritical Carbon Dioxide, JAOCS, vol. 78, No. 2 (2001).

Jerry W. King, et al., Critical Fluid Options for the Extraction and Enrichment of Nutraceuticals, International Society for the Advancement of Supercritical Fluids, Proceedings of the $7^{th}$ Meeting on Supercritical Fluids, Dec. 6–8, 2000.

Nurhan Turgut Dundford et al., Supercritical Carbon Dioxide Fractionation of Crude Rice Bran Oil Using a Packed Column with Characterization of Resultant Fractions, Supercritical Fluids for Sustainable Technology, $5^{th}$ International Symposium on Supercritical Fluids (ISSF 2000), pp. 1–10, Apr. 8–12, 2000.

Jerry W. King et al., Critical Fluid Options for the Extraction and Enrichment of Nutraceuticals, Proceedings of the $7^{th}$ Meeting on Supercritical Fluids: Particules Design, Materials and Natural Products Processing, pp. 537–547, Dec. 6–8, 2000.

*Primary Examiner*—Deborah Carr
(74) *Attorney, Agent, or Firm*—Curtis P. Ribando; John D. Fado (57) ABSTRACT

A two-step (two-stage) columnar supercritical fluid fractionation process enriches phytosterols and phytosterol esters in vegetable oils, particularly vegetable oils containing oryzanol and/or fatty acid or ferulic esters of phytosterols. The first stage is a deacidification and the second stage is a phytosterol enrichment. The method may be conducted in a continuous or semi-continuous mode of column operation and yields a product that is essentially free of residual objectionable or organic solvent.

15 Claims, 7 Drawing Sheets

SUPERCRITICAL FLUID FRACTIONATION PROCESS FOR PHYTOSTEROL ESTER ENRICHMENT VEGETABLE OILS

This application hereby claims the benefit of U.S. provisional patent application No. 60/338,738, filed Dec. 4, 2001, the contents of which are incorporated by reference herein.

BACKGROUND OF THE INVENTION

1. Field of the Invention

This invention relates a two-stage columnar supercritical fluid fractionation process for deacidifying vegetable oils and enriching the oils in phytosterols and phytosterol esters.

2. Description of the Prior Art

Certain vegetable oils, such as rice bran oil (RBO) and corn fiber oil have been identified as sources rich in phytosterols and other nutraceuticals such as tocopherol and tocotrienols. Research studies have shown that these oils have potential health benefits, such as lowering plasma cholesterol levels (R. J. Nicolosi et al., Atherosclerosis, 88:133–142, 1991), and C. Rukmini et al., J. Am. Coll. Nutr., 10:593–601, 1991), decreasing early atherosclerosis (N. Rong et al., Lipids, 32:303–309, 197), and inhibiting platelet aggregation (G. S. Seetharamiah et al., J. Nutr. Sci and Vitaminol., 36:291–297, 1990).

The free fatty acid (FFA) content of rice bran may be as high as 30–40% (w/w), if the bran is not processed properly prior to extraction of the oil (B. K. De et al., J. Am. Oil Chem. Soc., 76(10):1243–1246, 1999). This is due to the lipolysis caused by the native lipase enzymes present in the bran. FFA present in the crude oils are not desired. They are removed from crude oil by alkali refining during industrial edible oil processing.

Conventional chemical and physical vegetable oil processing techniques have several disadvantages, including the use of large quantities of water and chemicals, generating large quantities of waste, as well as being energy intensive (V. Kale et al., J. Am. Oil Chem. Soc., 76(6):723–727, 1999). Furthermore, a significant portion of the nutritive rice bran oil components is lost during the conventional refining processes. According to Orthofer (P. Bondioli et al., J. Am. Oil Chem. Soc., 69(5):477–480, 1992), 50% of the rice bran oil phytosterols are lost during the refining process. Xu et al. (JAOCS, 2000, 77:547–551) compare supercritical fluid and solvent extraction methods in extracting y-oryzanol from rice bran.

Alternative deacidification processes such as methanol extraction of FFA followed by membrane processing (V. Kale et al., J. Am. Oil Chem. Soc., 76(6):723–727, 1999) and reesterification of rice bran FFA with monoglycerides (B. K. De et al., J. Am. Oil Chem. Soc., 76(10):1243–1246, 1999) have been reported. Supercritical fluid fractionation (SFF) techniques with supercritical carbon dioxide (SC—$CO_2$) have been reported for deacidification of vegetable oils, including: refining of lampante oil (P. Bondioli et al., J. Am. Oil Chem. Soc., 69(5):477–480, 1992), and deacidification of roasted peanut (G. R. Ziegler et al., J. Am. Oil Chem. Soc., 70(10):947–953, 1993) and olive oil (L. Brunetti et al., J. Am. Oil Chem. Soc., 66(2):209–217, 1989). Recently, Dunford and King (N. T. Dunford et al., J. Food Sci. 65:1395–1399, 2000) have used a SFF tower approach to deacidify crude RBO and determined the optimal conditions for FFA removal, while minimizing phytosterol and triglyceride (TG) losses during the process. The fractionation tower utilized for this study was operated under isothermal conditions, however by applying a temperature gradient along the SFF tower, one may improve the purity of the extract by causing an internal reflux in the column (T. Clifford, Fundamentals of Supercritical Fluids, Oxford University Press Inc., New York, pp. 130–144, 1999).

Critical fluid processing can be used in several modes for producing nutraceutical ingredients or functional foods. Exhaustive extraction in which SC—$CO_2$ or a SC—$CO_2$-cosolvent mixture is used to yield an extract equivalent to those obtained with organic solvent extraction or pressing/expelling technologies (J. W. King et al., Supercritical Fluid Technology in Oil and Lipid Chemistry, AOCS Press, Champaign, Illinois, p. 435, 1996) and is well-documented in the recent literature (M. Mukhopadhyay, Natural Extracts Using Supercritical Carbon Dioxide, CRC Press, Bacon Raton, Florida, p. 339, 2000). Fractional extraction where extraction pressure, temperature, time, or the addition of a cosolvent is varied on an incremental basis, is also capable of producing extracts that are somewhat either enriched or depleted in the desired nutraceutical agents (J. W. King, Cosmet Toil., Vol. 61, p. 61, 1991). Such fluid density-based or cosolvent-assisted extractions frequently yield extracts with considerable extraneous material. Indeed specifically extracting or enriching a desired solute out of natural product matrix is somewhat complex and difficult due to the very low concentration levels of many of these agents.

To enrich the concentration of desired component(s), researchers have resorted to fractionation techniques utilizing critical fluids. One of the simplest is separation of the extract with the aid of multiple separators held at different combinations of temperatures and pressures (E. Reverchon, J. Supercrit. Fluids, Vol. 5, p. 256, 1992). Using such an approach, the fractionation of essential oils from waxes and oleoresins has been accomplished. The use of fractionation columns in which a temperature gradient is imposed on a solute-laden flowing stream of SC—$CO_2$, either in a batch or countercurrent mode, is now being widely practiced. This methodology has been used for the production of fish oil concentrates (V. J. Krukonis et al., In: Advances in Seafood Biochemistry, G. J. Flick and R. E. Martin, Technomic Publishing Co., Basel, p. 169, 1992), fractionation of peel oil components (E. Reverchon et al., Ind. Eng. Chem. Res., Vol. 36, p. 4940, 1997), and glyceride fractionation (J. W. King, In: Supercritical Fluids—Fundamentals and Applications, E. Kiran, Kluwer Academic, Dordrecht, The Netherlands, p. 451, 2000). The coupling of critical fluids with chromatography on a preparative or production scale offers another alternative route to producing nutraceutical-enriched extracts. These chromatographic-based separations range from simple displacement or elution chromatographic schemes, i.e., the removal of cholesterol (A. Shishikura et al., Agric. Biol. Chem., Vol. 50, p. 1209, 1986; R. S. Mohamed et al., J. Supercrit. Fluids, Vol. 16, p. 225, 2000), to the more sophisticated simulated moving bed technology (T. Giese et al., In: Proceedings of the International Meeting of the GVC-Fachausschuss "Hochdruckverfahrenstechnik," N. Dahmen and E. Dinjus, Karlsruhe, Germany, March 3–5, p. 283, 1999); the latter technique perhaps is more favored for the purification of pharmacological compounds.

Manufacture of commercially-available, phytosterol-enriched products involves isolation of free sterols from either tall oil deodorizer distillate or soybean oil. Since free sterols are not soluble in many food systems, they are esterified with fatty acids to obtain sterol esters, which have higher solubility in fats allowing them to be incorporated into the food systems as functional (cholesterol-lowering) ingredients.

SUMMARY OF THE INVENTION

We have now discovered a unique two-step (two-stage) columnar supercritical fluid fractionation process for enriching phytosterols and phytosterol esters (hereafter, "phytosterols") in vegetable oils, particularly vegetable oils containing oryzanol and/or fatty acid or ferulic esters of phytosterols. The first stage is a deacidification that utilizes a series of pressurized column zones having a thermal gradient that will minimize triglyceride (TG) and phytosterol losses. The fraction taken from the highest temperature zone (top) is rich in free fatty acids (FFA), while the product (raffinate) taken from the lowest temperature zone (bottom) is rich in phytosterol and TG. The raffinate from the first stage is introduced into the second stage (enrichment) comprising a second series of pressurized column also having a thermal gradient. The phytosterol-enriched triglyceride is taken off the second stage. (top) zone having the highest temperature of the gradient; and the raffinate from the lowest temperature zone (bottom) of the second stage is a low acidity, TG-rich edible oil.

In accordance with this discovery, it is an object of this invention to provide a method for the enrichment of phytosterols from vegetable oil sources.

It is more specific object of the invention to provide a method to enrich phytosterols in oryzanol and/or phytosterol-containing triglycerides and to simultaneously remove unwanted free fatty acids.

It is a further object of this invention to obtain enriched fractions of phytosterols, fatty acid esters of phytosterols and/or ferulic acid esters of phytosterols in a continuous or semi-continuous mode of column operation.

It is also an object of the invention to process a phytosterol-containing triglyceride using a GRAS (generally regarded as safe) solvent system and to recover product that is essentially free of residual solvent.

Another object of the invention is to enrich the phytosterol component of triglycerides by a method that is economically feasible and adaptable to industrial scale production.

Other objects and advantages of this invention will become readily apparent from the ensuing description.

DETAILED DESCRIPTION

Starting materials for use in this invention include substrates containing any phytosterol or phytosterol ester (particularly phytosterol fatty acid ester or phytosterol ferulic acid ester). Of particular interest are oryzanol-containing oils, such as rice bran oil, and also corn fiber oil. In addition, safflower oil (a source of phytosterols) and deodorizer distillates derived from vegetable oil feedstocks (i.e., rice bran and soybean oil deodorizer distillates) can be enriched with respect to their sterol and steryl ester components using this methodology.

The two-stage method of this invention utilizes a high pressure packed column and a supercritical fluid, preferably SC—$CO_2$ as solvent. Some other supercritical fluid solvents would include the fluorocarbons, ethylene and propane. The feed into the first stage may be any vegetable oil, containing oryzanol and/or fatty acid esters of phytosterols. The first stage of the two-stage method is referred to as a "deacidification" (i.e., removal of FFA); and the second stage is referred to as an "enrichment" (i.e., enrichment of the phytosterol esters in the TG).

In the first stage, free fatty acids (FFA) are removed in a column operating isobarically in the pressure range of 1500–2500 psi (105–170 bar). An increasing thermal gradient in the range of about 40–90° C. (ΔT of at least about 40°–50° C.) in a series of zones within the column is beneficial to minimize TG and phytosterol losses. Due to the low density and low solvent power of SC—$CO_2$ at these pressures, the low (40° C.) temperature of the first zone serves to maintain a higher solvent density, which along with the vapor pressure differences in the respective components to be separated, facilitates the deacidification process. Moreover, an ascending order temperature gradient amplifies the vapor pressure differences in the components and the benefits thereof can be realized without exceeding temperatures (i.e., >80–90° C.) that could cause oxidation and/or degradation of some of the lipid components. An extract having a high concentration of FFA is taken from the highest temperature zone in the thermal gradient (usually the top of the column), and the raffinate rich in TG and phytosterol esters is collected in the lowest temperature zone (usually at the bottom of the column).

The second stage of the method is the recovery of phytosterol-enriched end product from the raffinate obtained from the first stage. This stage is carried out in a fractionation column at about 3000 psi (205 bar) or higher. It is critical to the phytosterol enrichment that the second stage fractionation is carried out at this higher pressure relative to the pressure of the first stage. An increasing thermal gradient ($\Delta T$ of at least about 40–50° C.) along the column (e.g., 40–90° C. temperature range) once again serves to enhance the phytosterol ester content of the end product. The final product is collected from the zone of highest temperature (usually from the top) of the second stage column. Residual TG is recovered from the zone of lowest temperature (usually the bottom) of the second stage column. Both deacidification and enrichment (end product recovery) can be carried out in semi-continuous or continuous mode of column operation. In semi-continuous mode, the substrate is introduced on a batch basis, and the solvent is continuously passed through the substrate. Countercurrent continuous column operation for either or both stages (as explained further, below) improves the throughput and economic feasibility of the process and is more adaptable to industrial scale production.

The supercritical fluid, which is supplied to the bottom of the column continuously, moves upward and strips the more soluble and volatile components from the feed. For the described temperature gradient, the higher temperature zones at the top of the column reduce the supercritical fluid density, thereby condensing the less soluble or volatile compounds and facilitating internal refluxing. Therefore, the supercritical fluid moving up the column contacts this condensate counter-currently, and the concentration of the extract fraction is achieved according to the solubility and volatility of the respective oil components in the fluid stream. The lower section of the column, which holds the feed material may be referred to as the "stripping section" and the upper part (temperature gradient imposed section) as the "enrichment section".

The extract from the second fractionation step is rich in phytosterol esters and can be used as a functional food ingredient and/or nutraceutical. Using this method, phytosterol contents of 5%, 7.5%, 10%, and even 15% w/w or greater can be obtained. The resultant raffinate is a low acidity TG-rich edible oil.

It is also contemplated that both the aforementioned deacidification and enrichment could be-conducted in a single column. In that case, there would be a first series of pressurized column zones having a thermal gradient at a pressure within the range of 1500–2500 psi (105–170 bar); and a second series of pressurized column zones having a thermal gradient at a pressure exceeding 3000 psi (205 bar). This is usually accomplished by increasing the pressure in the column after the deacidification process. Thus, the extract enriched in free fatty acids is removed from the zone in the first series having the highest temperature within the gradient (the top of the column); and the phytosterol- and/or phytosterol ester-enriched raffinate tends toward to accumulate in the zone having the lowest temperature within the thermal gradient in the first series (the bottom of the column). The pressure in the column is then increased for the enrichment step, without having to remove the raffinate. The phytosterol- and/or phytosterol ester-enriched triglyceride is recovered from the zone having the highest temperature within the gradient (the top of the column). Raffinate from either stage may be recirculated into the feed for that stage or, in the case of the raffinate from the second stage enrichment, it may be recirculated to the feed for the first stage fractionation.

The following examples are intended to further illustrate the invention, without any intent for the invention to be limited to the specific embodiments described therein.

EXAMPLE 1

Semi-continuous Fractionation

Methods

Crude RBQ (Table 1), commercially extracted with hexane (Riceland® Foods Inc., Stuttgart, Arkansas) was used as a feed material for all the experiments. The crude oil (containing about 7% FFA) was centrifuged at 3000 rpm for 20 minutes prior to conducting the fractionation experiments, and the supernatant was used as feed material for the SFF column.

Extract and raffinate fractions were analyzed for FFA, TG, and phytosterol contents according to methods described in detail by Dunford and King (*J. Food Sci.* 65:1395–1399, 2000). TG, FFA and sterol fatty acid ester (StE) contents of the samples were analyzed by HPLC according to Moreau et al., (*J. Agric. Food Chem.* 44:2149–2154, 1996). Lipid and sterol components in the oil samples were separated on a LiChrosorb® Diol, 5 $\mu$m, 100×3 mm column (Chrompack® Inc., Raritan, New Jersey). The mobile phase gradient consisted of solvent A, hexane/acetic, 1000/1, v/v; and solvent B, acid/2-propanol, 100/1, v/v. The linear HPLC gradient timetable was: at 0 minutes, 100/0; at 5 minutes 100/0; at 12 minutes 75/25; at 40 minutes 75/25; at 41 minutes 100/0; at 60 minutes 100/0 minutes (% A and % B respectively). Eluent flow rate was held constant at 0.5 mL/minute. The ELSD detector was operated at 40° C. with nitrogen as a nebulizing gas at a flow rate of 1.60 L (STP)/minute. The column heater temperature was set at 40° C. Oil samples were dissolved in hexane (about 20-mg/mL) and a 10 $\mu$L injection volume was used.

Free sterol and oryzanol compositions of the samples were determined by a supercritical fluid chromatography (SFC), with a SB-Phenyl-50 capillary column (10 m×100 $\mu$m i.d., 0.5 $\mu$m film thickness, Dionex® Corp., Salt Lake City, Utah). The carrier gas was SFC-grade carbon dioxide (Air Products, Inc., Allentown, Pennsylvania). All oil components were detected and quantified by a flame-ionization detector (FID) held at 350° C. The oven temperature was kept at 100°. The injector valve sample loop (Valco® Inc., Houston, Texas) volume and injection time were 200 nL and 1 s, respectively. The following pressure program was used for the SFC analysis; the initial pressure was held at 100 atm for 5 minutes and then increased to 150 atm at the rate of 5 atm/minute. The ramp rate at this point was changed to 2 atm/minute until a pressure of 180 atm was reached. Here, the pressure-programming rate was changed to 5 atm/minute until a pressure of 280 atm was reached. This was followed by rapid inverse pressure-program from 280 atm to 100 atm at a rate of −100 atm/minute to reestablish the initial column pressure conditions.

Triglyceride and FFA composition of the samples were reported as HPLC area percentages, whereas oryzanol, StE and free sterols were expressed as weight percentages unless otherwise stated. Each sample was injected at least twice and the average of the two analyses was reported.

Column Fractionation

The SFF experiments were carried out on a pilot-scale (1.70 m height and 1.43 cm i.d.) packed column. Details of the column design and controls were previously described by King et al. (*J. Supercritical Fluids* 10:127–137, 1997). The first stage fractionation experiments were performed isobarically at a pressure range of 13.6 MPa (2000 psi). The SFF column consisted of a preheater and four separately heated zones. Each zone was heated to the desired temperature (40–90° C.) using heating mantels (Glas Col®, Inc., Terre Haute, Indiana). The temperature of the preheater was set at the same temperature as the first heated zone. The column was filled with $CO_2$ before the feed was introduced. For each run, 30 mL of crude oil was pumped into the column above the first heated zone by a liquid metering pump (Model MS-188, Haskel® Inc., Burbank, California) connected to a pump stroke controller. Then the column was pressurized and allowed to equilibrate till the set temperatures were reached. The deacidification process was carried out in a semi-batch mode of operation. Carbon dioxide was introduced in the continuous mode and oil was in the batch injection mode. Extract and raffinate samples were collected from the top and bottom of the column, respectively. The carbon dioxide flow rate was 1.2 L/minute, as measured at room temperature and pressure. Fractionation run times were 180 minutes unless otherwise stated. The column was depressurized and residual oil was drained at the end of each run. At the conclusion of the run, the column was cleaned at 34.0 MPa (340 bar, 5000 psi) and 90° C. with flowing $CO_2$ for over 6 hours.

Figure 3:
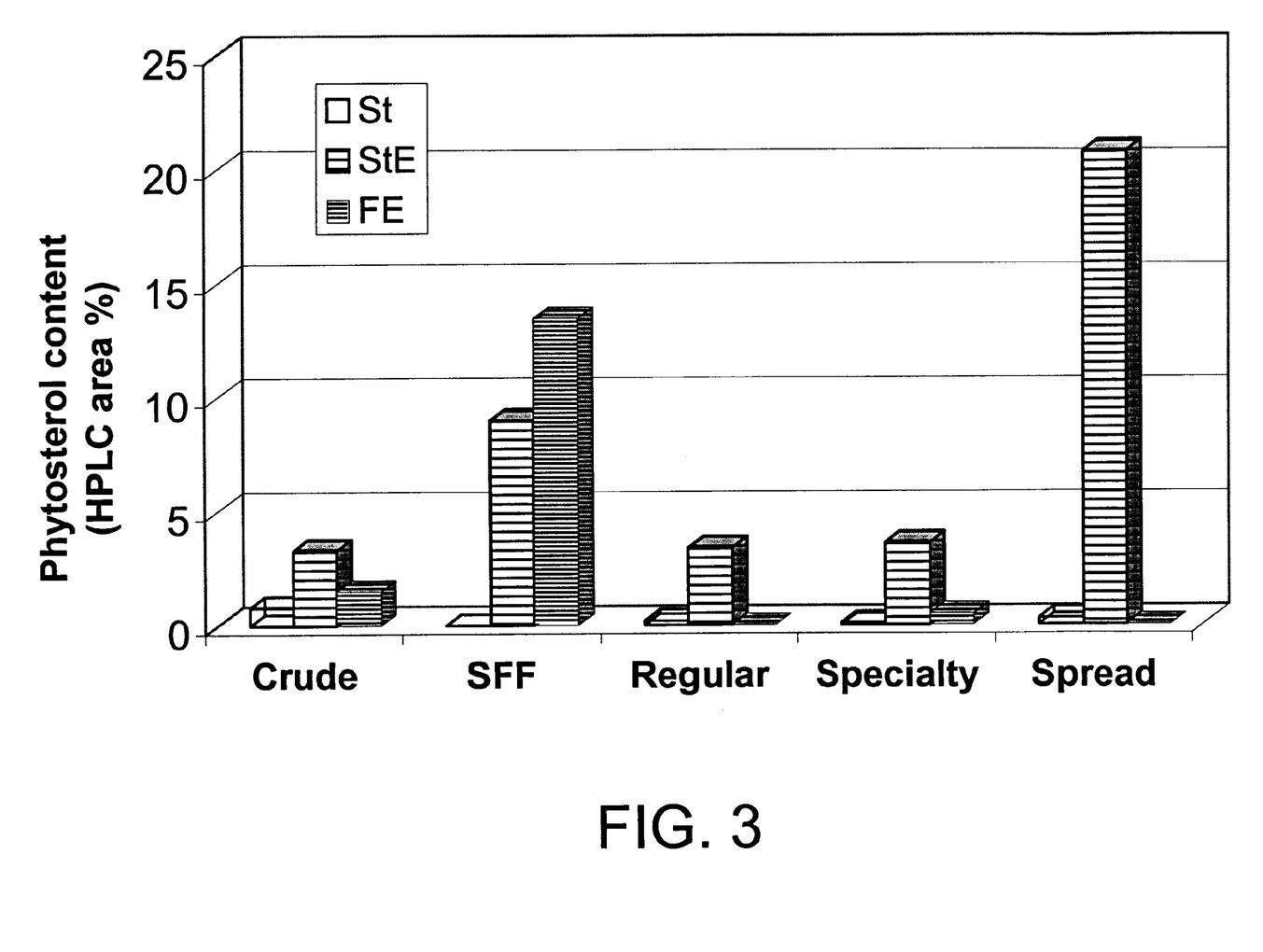
FIG. 3 is a bar graph comparing a supercritical fluid fractionation (SFF) product with commercially available RBO samples and a phytosterol-enriched margarine (Benacol). SFF product was obtained by a two-step fractionation method. Initially, FFA content of the crude RBO oil was reduced from 7 to 0.5% at 13.6 MPa (136 bar, 2000 psi) and 40/60/70/80° C.; then the raffinate was further extracted at 20.5 MPa (205 bar, 3000 psi) and under the same thermal gradient conditions. The flow rate of the $CO_2$ was 2 L/minute for both fractionating steps. StE=fatty acid esters of phytosterols, FE=ferulic acid esters of phytosterols (i.e., oryzanol), St=free sterols, Crude=crude RBO, Regular=commercially refined RBO, specialty=commercially produced "high-oryzanol" RBO, spread=phytosterol-enriched margarine (Benacol).

The second stage fractionation was performed as above except that the isobaric pressure was 20.5 MPa (3000 psi). FIG. 3 shows recovery of triglyceride oil fractionation product having in excess of 9% phytosterol fatty acid esters (StE) and in excess of 13% ferulic acid esters of phytosterols (FE, i.e., oryzanol). The combined amount of these components is very similar to that of a commercially-available sterol ester enriched margarine/spread, ~21% (HPLC area percent). Sterol esters in the SFF product were in the form of both sterol esters of fatty acids and ferulic acid (oryzanol), whereas the commercial product contained only the fatty acid esters of sterols. No oryzanol was detected in the RBO feed material, which was refined using conventional methods. oryzanol content of the specialty oil, which was marketed as "high oryzanol" oil was only 0.5%. The SFF product had a very similar FFA content (0.1%) to the commercially available RBO products (0.09%).

Statistical Analysis

All fractionation runs and analysis of each extract and raffinate sample were carried out in duplicate and in randomized order with the means being reported. Analysis of variance (ANOVA) of the results was performed using General Linear Model procedure of Statistix software (Version 4.1, Analytical Software, Tallahassee, Fla.). Multiple comparison of the various means were carried out by LSD (Least Significant Difference) test at $p=0.05$.

Temperature Effect

The effect of isothermal and thermal gradient column operations on extract and raffinate compositions is shown in Table 2. TG concentration of the extract fraction was significantly lower than that of the raffinate fraction for all the experimental conditions studied. This is due to the low solubility of TG in SC—$CO_2$ at this low solvent density. When a thermal gradient is applied along the column, the TG concentration of the extract was lower and FFA concentration higher, relative to results achieved under isothermal operation.

TG concentration of the extract fraction decreased and FFA increased significantly with increasing temperature of the stripping section of the fractionation column (Table 2). TG loss in the extract fraction can be further reduced by decreasing the pressure of the system. For example, TG and FFA concentration of the extract fraction was <10% and >75%, respectively, during a 3 hour fractionation run at 12.2 MPa (122 bar, 1750 psi) and 45/55/65/75° C. These results confirm that application of a thermal gradient along the column will increase the efficiency of FFA removal from the feed material and decrease the TG loss in the extract fraction during deacidification.

Oryzanol and StE content of the extract fractions were significantly lower than those of the raffinate samples (Table 2). However, free sterol content of the fractions showed an opposite trend, a higher amount of free sterols was lost with the extracts (Table 2). Oryzanol content of the fractions did not show an apparent trend with either isothermal or thermal gradient column operations. However, free sterol content of the extract fractions was significantly higher and StE content was lower under thermal gradient column operation (Table 2).

Fractionation time

Figure 1:
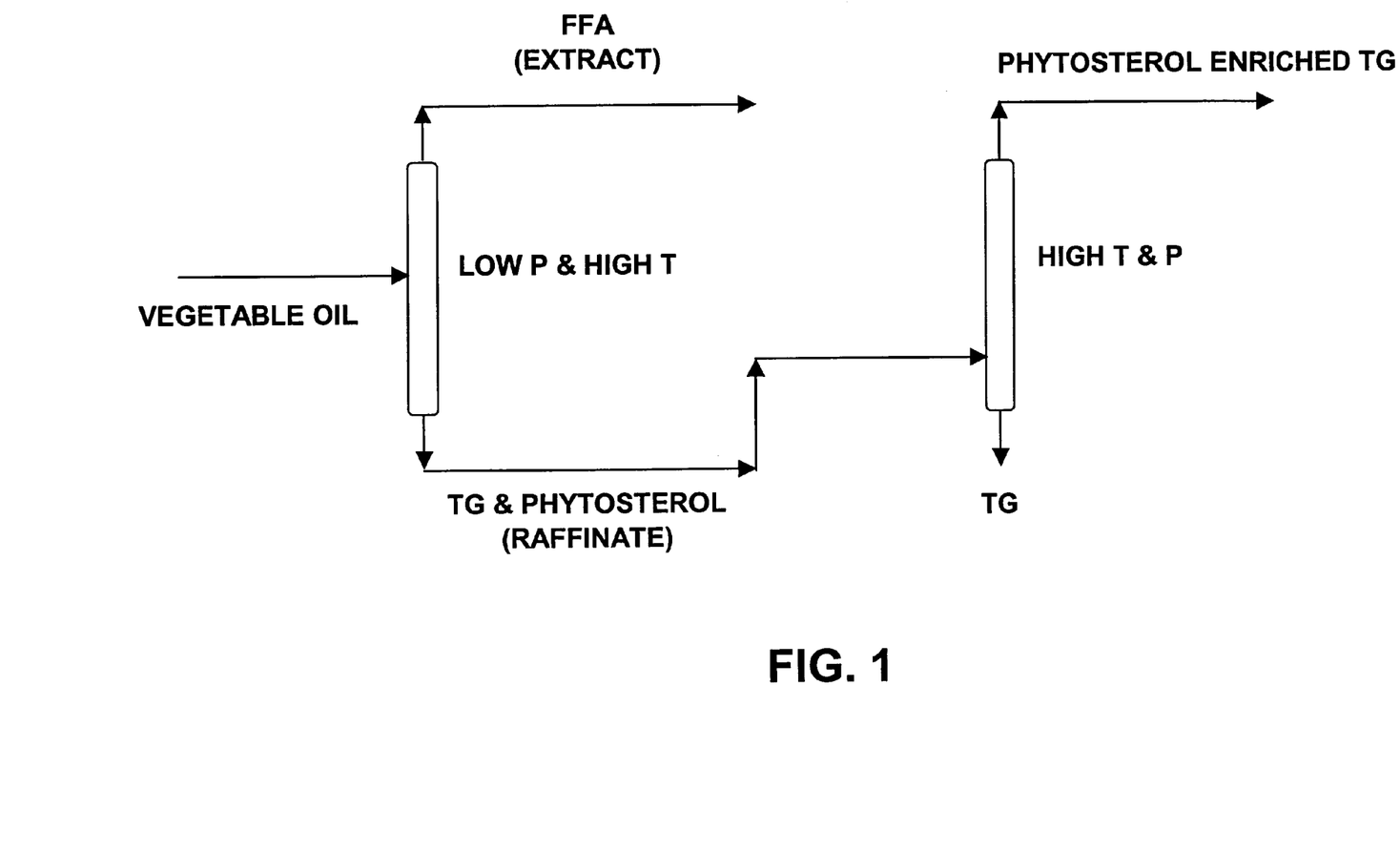
FIG. 1 is a schematic diagram of a two-step columnar fractionation process for steryl ester enrichment in vegetable oils in accordance with the invention.
Figure 2:
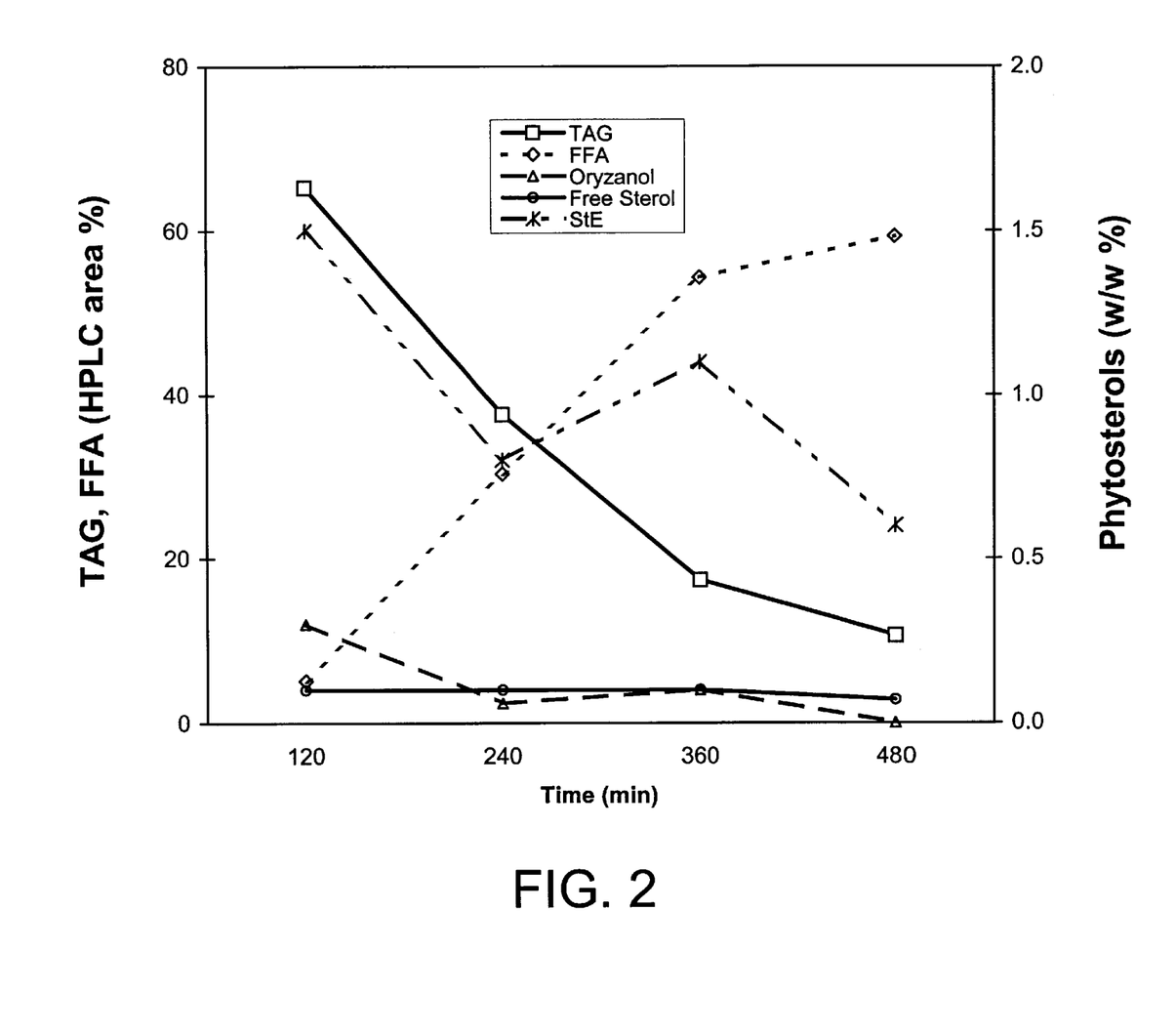
FIG. 2 is a graph showing the effect of fractionation time on the composition of extract fraction from crude rice bran oil. The crude rice bran oil fractionation was carried out at 13.6 MPa (136 bar, 2000 psi) and a 45/60/80/90° C. (temperature gradient in ascending order) at a 1.2 L/minute $CO_2$ flow rate. TAG, triacylglycerol (■); free fatty acid (♦); oryzanol (▲) free sterol (●); sterol fatty acid ester (x). HPLC, high-performance liquid chromatography.

TG and FFA content of the extract samples changed significantly with the fractionation time (FIG. 2). TG content of the extract fractions decreased from 65.3% to 10.6% while FFA content of the same sample increased from 5.1% to 59.3% during a 480 minute fractionation run. Free sterol composition of the extract fraction was not affected significantly by the fractionation time. Although StE content of the fractions showed a sharp decline during the initial stages of the process (0–240 minutes), these changes became less pronounced later in the process (360–480 minutes). A slight decrease was observed in the oryzanol content of the extracts. Changes in extract composition in time are due to the changes in the composition of oil present in the column during the semi-continuous fractionation process. $CO_2$ flow rate The fluid flow rate in the fractionation column can be an important operation parameter affecting the efficiency of the fractionation process. As shown in Table 3, increasing $CO_2$ flow rate from 1.2 L/minute to 2 L/minute did not affect the composition of the extract fraction significantly. Hence, operating the column at a higher $CO_2$ flow rate, 2 L/minute, can reduce the fractionation time without impairing the FFA removal efficiency.

EXAMPLE 2

Continuous Countercurrent First Stage Fractionation

Methods

Crude RBO (Riceland® Foods) was centrifuged as described in Example 1. Free fatty acids (FFA), free sterols (St), phytosterol fatty acid esters (StE) and oryzanol (FE) contents of the centrifuged crude RBO and the SFF raffinate fraction were analyzed by HPLC according to Moreau et al., supra (Table 4). Lipid and sterol components in the oil samples were separated as described in Example 1.

SFF Column Design

An SFF apparatus consisting of a 1.83 m×10.2 cm outer diameter stainless steel column was used for the fractionation experiments. The fractionation column consisted of a preheater and four independently controlled temperature zones. The heights of the each heated zone were 43.2 cm, 45.7 cm, 45.7 cm, and 27.9 cm, from top to bottom. Each zone was heated to the desired temperature using 15.2 cm by 30.5 cm, 0.775 w/cm$^2$, silicon rubber heaters wrapped around the column and powered through solid state relays. The temperature of each individual zone was maintained with PID (Proportional-Integral-Derivative) controllers sensing from type-i surface-mount thermocouples. Internal zone temperatures were monitored with a ten-input digital indicator sensing from seven 1.59 mm diameter type-J thermocouples. Internal zone temperatures remained within 2° C. of the respective set point.

The internal dimensions of the pilot scale fractionation column were 1.66 m×4.45 cm providing a total column volume of 2.58 L. The column was packed with protruded stainless steel packing material (0.16-Inch Pro-Pak, Scientific Development Company, State College, Pennsylvania) packed to a density of 0.483 kg/L. Two separate ports at the bottom and side of the lower section of the column allowed for $CO_2$ input and raffinate removal. The lower section of the column below the $CO_2$ inlet (the bottom 20.3 cm) was used as a raffinate section.

Carbon dioxide was introduced into the column via an air-driven gas booster pump. Feed was metered into the column using an air-driven liquid pump controlled with a pulse-timer. Fluid leaving the column was expanded across a micrometering valve, thereby permitting the oil fractions to precipitate into a collection vial. The expended gas stream then passed through a dry gas test meter, allowing measurement of the gas volume used before venting to the atmosphere.

Column Fractionation

Fractionation experiments were carried out in a continuous countercurrent mode of operation. Initially the column was filled with $CO_2$ and allowed to equilibrate at the desired temperature and pressure. Then continuous oil and $CO_2$ flows commenced and extract collection was initiated. Carbon dioxide was allowed to enter the system from the bottom of the column, directly above the raffinate collection section. Oil was delivered into the system from the top of the column so as to allow sufficient countercurrent contact of SC—$CO_2$ with the feed material for the entire length of the column. Solute-laden SC—$CO_2$ then heads upwards in the column and the resultant extract was collected from the top of the column in a collection vial. The oil components, which were not solubilized significantly in SC—$CO_2$, accumulated in the raffinate section at the bottom of the column. The raffinate section was drained in 15minute intervals to avoid overflow of the raffinate fraction into the fractionation section of the column. During a typical SFF experiment, steady state conditions were reached in the column within the first 3 hours of operation. Steady state operation of the column was ascertained by attaining constant weight and composition of the extract fraction collected in 30 minute intervals.

The fractionation experiments were carried out under isobaric and isothermal conditions over the pressure and temperature range of 2000–3990 psi (138–275 bar) and 45–80C., respectively. Carbon dioxide and oil flow rates were 2 L/minute and 0.7 mL/minute, respectively, as measured at ambient conditions. After the completion of the experiment the column was depressurized and residual oil drained off at the end of each run. The column was cleaned between runs at a pressure of 5000 psi (345 bar) and temperature of 90° C. by flowing $CO_2$ for more than 6 hours.

Statistical analysis

All fractionation runs and analysis of each extract and raffinate sample were carried out in duplicate and in randomized order with the mean values being reported. Analysis of variance (ANOVA) of the results was performed using General Linear Model procedure of SAS (Software Version 8.1. SAS Institute Inc., Cary, N.C.). Multiple comparison of the various means were carried out by LSD (Least Significant Difference) test at $p=0.05$.

Effects of Temperature and Pressure

Table 4 compares the composition of the RBO starting material with a typical raffinate fraction obtained at 138 bar and 80° C.

Figure 4:
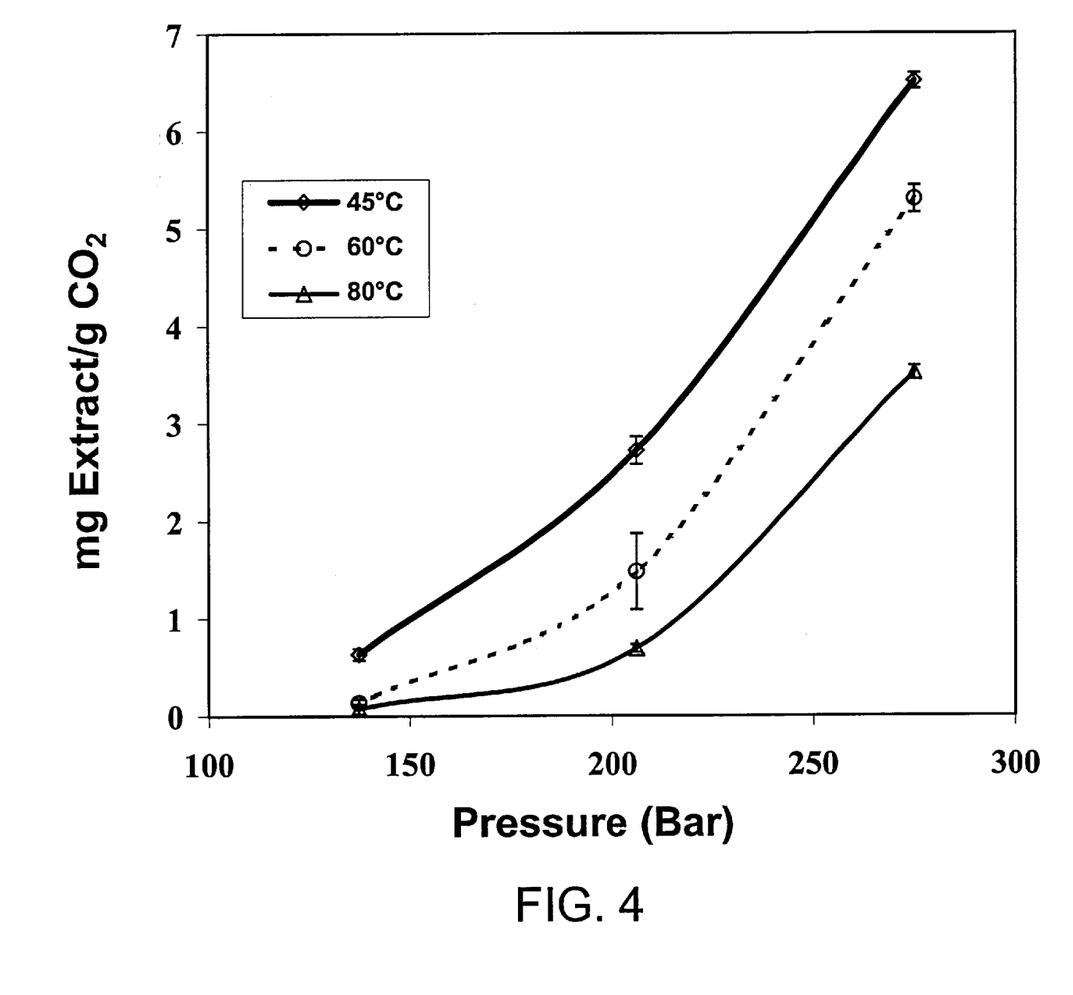
FIG. 4 is a series of graphs showing the effect of temperature and pressure on the SC—$CO_2$ loading during SFF of RBO.
Figure 5:
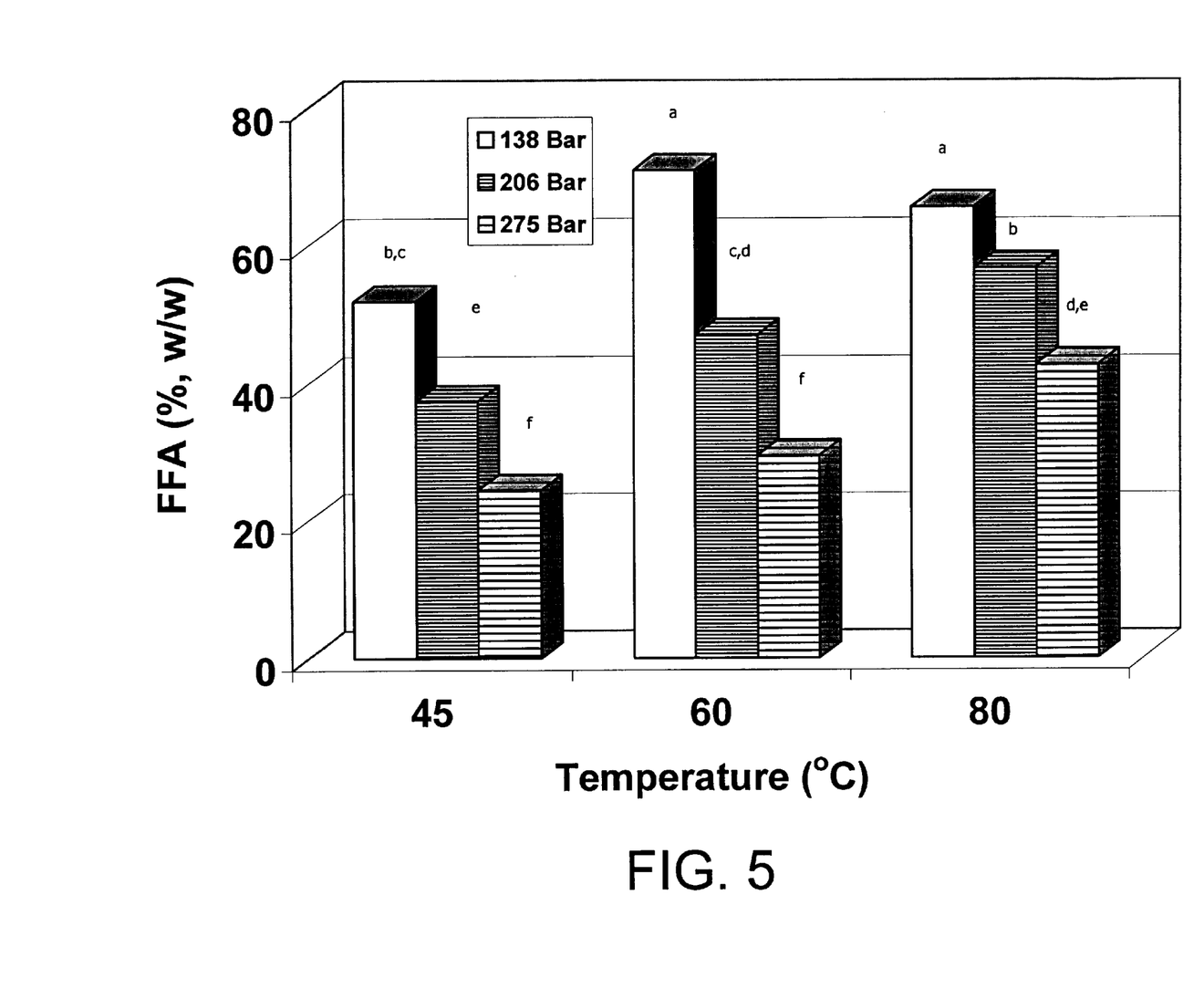
FIG. 5 is a series of bar graphs showing the effect of temperature and pressure on the FFA composition of SFF extract fractions. Bars with the same letter are not significantly different at $p>0.05$ level.

The solute loading of the SC—$CO_2$, defined as 1 mg of extract collected from 1 g of $CO_2$, increased with increasing pressure and decreasing temperature as shown in FIG. 4. This can be explained by the higher density of SC—$CO_2$ at higher pressures and lower temperatures hence higher solvent power of SC—$CO_2$ under these conditions. Therefore, processing at high pressures and low temperatures requires less solvent (SC—$CO_2$) and reduces the processing time. However, examination of the extract composition showed that the FFA content of the extracts was lowest at the highest pressure and lowest temperature examined (FIG. 5), indicating that SFF fractionation under these conditions is not suitable for efficient FFA removal from the crude oil. This is in part due to the large amount of TG lost in the extract fraction during high pressure and low temperature processing. For example, there is a higher TG con tent in the extract s at a higher pressure and lower temperature (i.e., 60%, wp w TG at 275 bar and 45° C. as compared to <10%, w/w TG at 138 bar and 80° C.) due to the higher SC—$CO_2$ density and increased volatility of TGs. These results a re similar to the data obtained from the semi-continuous process of Example 1 and confirm that the deacidification process should be carried out at lower pressures and high temperatures to expedite FFA removal commensurate with lower TG loss in the extract.

Figure 6:
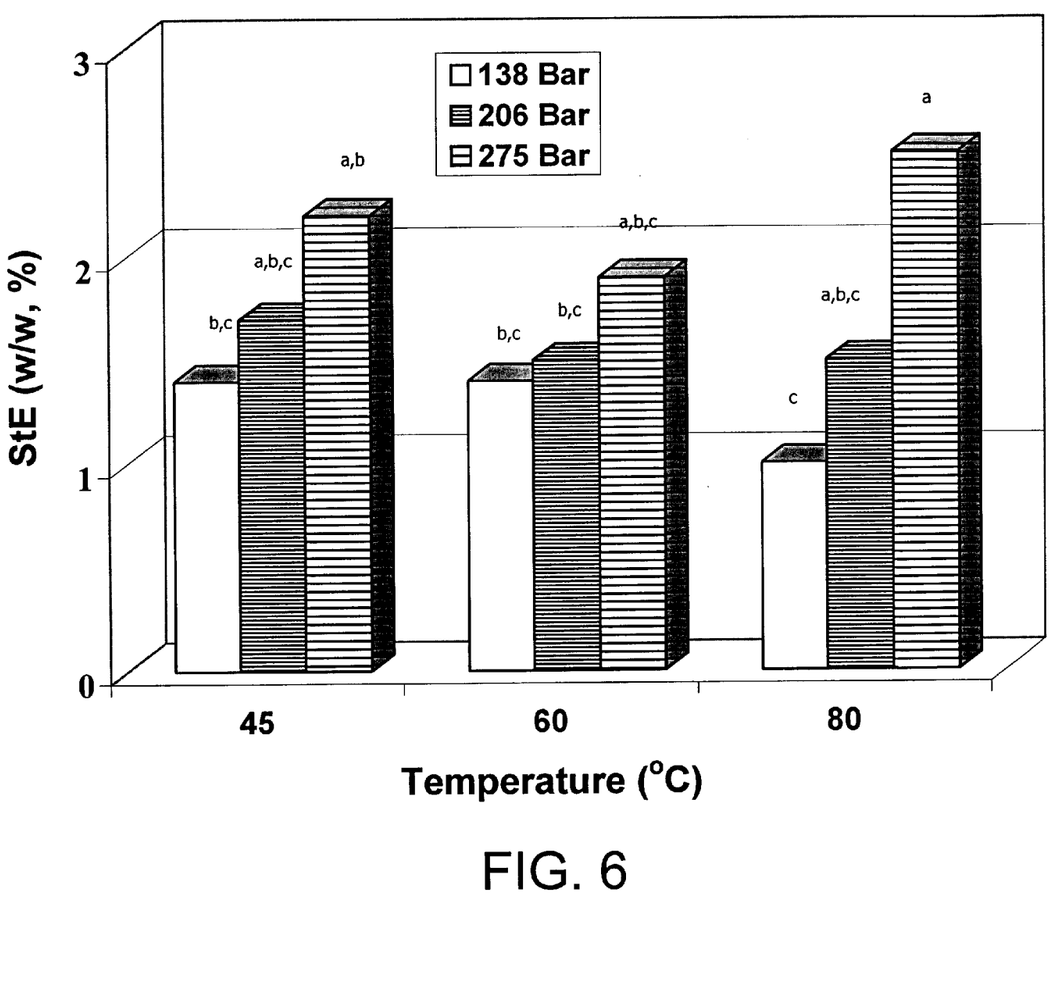
FIG. 6 is a series of bar graphs showing the effect of temperature and pressure on the sterol fatty acid ester (StE) content of SFF extract fractions. Bars with the same letter are not significantly different at $p>0.05$ level.
Figure 7:
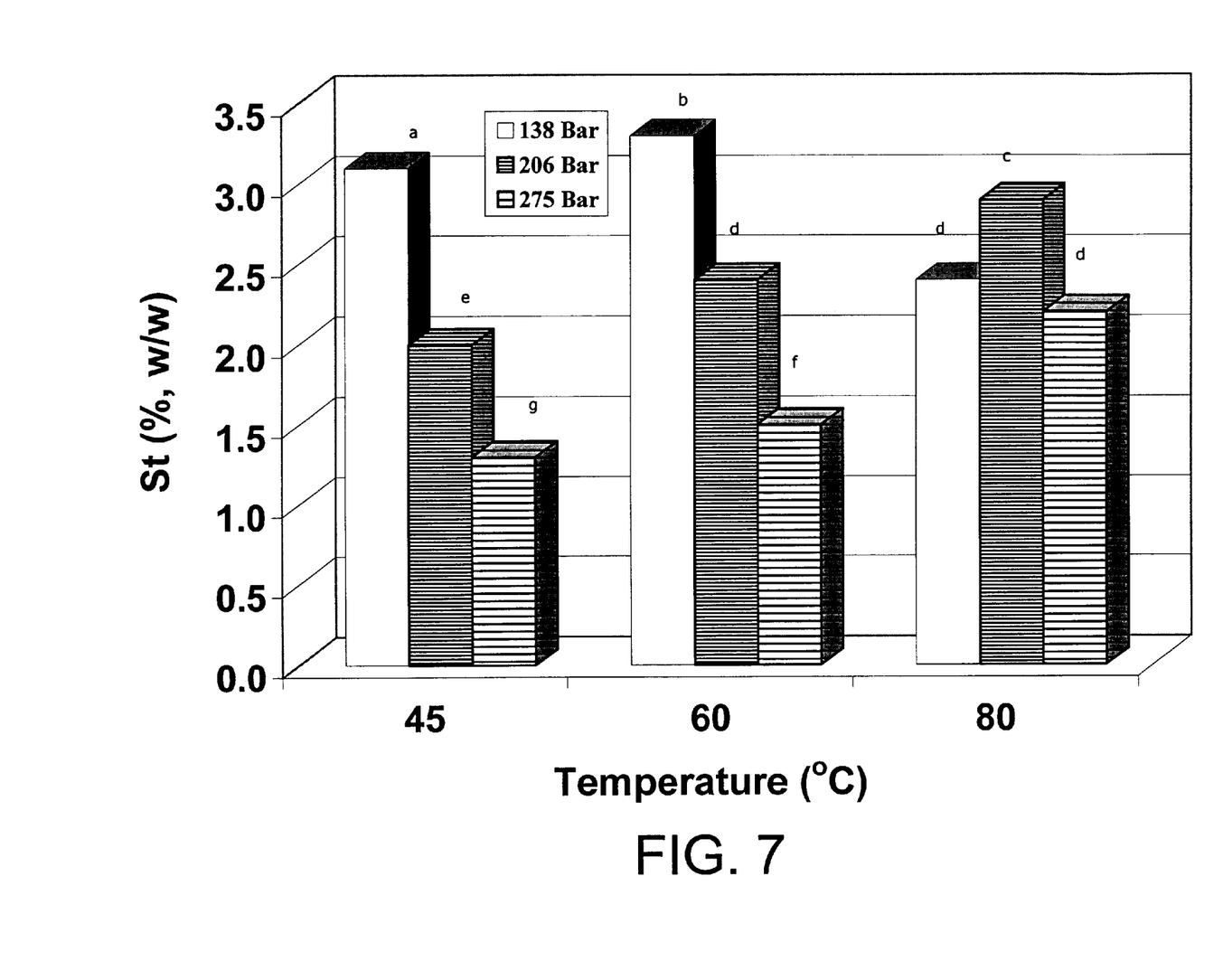
FIG. 7 is a series of graphs showing the effect of temperature and pressure on the free sterol (St) composition of the SFF extract fractions. Bars with the same letter are not significantly different at $p>0.05$ level.

A larger amount of StE was removed with the extract at higher pressures (FIG. 6). At lower pressures StE content of the extract (~1%, w/w) was lower than that of the starting material (2.6%, w/w, Table 4) indicating that these compounds were concentrated in the raffinate fraction. The trend was opposite for the free sterols (FIG. 7). Free sterol content of all the extract fractions was higher (>1%, w/w) than that of the starting material (0.7%, w/w), indicating a significant amount of free sterols loss in the extract. A similar trend was observed for St during the semi-continuous SFF processing of Example 1.

Other than for the extracts collected at 275 bar and 45° C. (2.7%, w/w FE), the oryzanol content lost to all the other extract samples was lower than the HPLC detection limit. These results demonstrate a significant improvement over commercial edible oil deacidification methods and the semi-continuous SFF process of Example 1. Some oryzanol was lost in all the extracts collected during the semi-continuous SFF process and no oryzanol could be detected in the commercial RBO samples analyzed by Dunford and King (*Journal of the American Oil Chemists' Society*, 78, 121–125, 2001).

Table 4 shows a typical SFF raffinate composition from the continuous countercurrent SC—$CO_2$ deacidification process. Oryzanol content of the RBO was tripled when removing half of the FFA present in the starting material. Phytosterol fatty acid ester composition of the raffinate fraction was also found to be higher than that of the feed material, however StE enrichment was not as high as that found for oryzanol.

It is understood that the foregoing detailed description is given merely by way of illustration and that modifications and variations may be made therein without departing from the spirit and scope of the invention. All patents and publications cited herein are incorporated by reference.

TABLE 1

| Crude Rice Bran Oil Composition[a] | |
| --- | --- |
| Triacylglycerols (HPLC area %) | 70 ± 2 |
| Free fatty acids (HPLC area %) | 7.0 ± 0.5 |
| Oryzanol (wt %) | 1.3 ± 0.1 |
| Free sterols (wt %) | 0.33 ± 0.03 |
| Sterol fatty acid esters (wt %) | 3.6 ± 0.3 |

[a]HPLC, high-performance liquid chromatography.

TABLE 2

Effect of Isothermal and Thermal
Gradient Column Operations on the SFF Fractions[a]

| Column Temperature (° C.) | TAG[b] | FFA[b] | Oryzanol[c] | Free sterol[c] | StE[c] |
|---|---|---|---|---|---|
| Extract | | | | | |
| Isothermal at 45° C. | 52.5[d] | 26.9[b] | 0.24[a] | 0.76[b,c] | 1.65[a] |
| 45/55/65/75[d] | 45.7[c] | 29.8[c] | 0.23[a] | 0.90[c] | 2.35[b,c] |
| Isothermal at 60° C. | 45.6[c] | 31.6[c] | 0.24[a] | 0.83[b,c] | 2.28[b] |
| 60/70/80/90[d] | 24.2[a] | 52.0[e] | 0.17[a] | 1.27[d] | 1.60[a] |
| Isothermal at 80° C. | 36.5[b] | 36.9[d] | 0.45[b] | 0.70[b] | 2.79[c,d] |
| 80/85/90/95[d] | 24.1[a] | 49.3[e] | 0.26[a] | 1.36[d] | 1.72[a] |
| Raffinate | | | | | |
| Isothermal at 45° C. | 73.2[e] | 4.9[a] | 1.35[d,e] | 0.28[a] | 3.55[e,f,g] |
| 45/55/65/75[d] | 71.8[e] | 4.4[a] | 1.24[c,d] | 0.29[a] | 3.43[e,f] |
| Isothermal at 60° C. | 71.5[e] | 4.8[a] | 1.41[e] | 0.35[a] | 3.84[f,g] |
| 60/70/80/90[d] | 71.6[e] | 5.2[a] | 1.25[c,d] | 0.28[a] | 3.58[e,f,g] |
| Isothermal at 80° C. | 72.4[e] | 5.1[a] | 1.29[c,d] | 0.29[a] | 4.00[g] |
| 80/85/90/95[d] | 70.7[e] | 5.4[a] | 1.21[c] | 0.29[a] | 3.09[d,e] |

[a]The numbers in the same column with the same letter are not significantly different ($P > 0.05$). Fractionation experiments were carried out at 20.5 MPa for 180 minutes.
[b]As HPLC area %
[c]As w/w % (StE = sterol fatty acid esters)
[d]Temperature gradient in ascending order. SFF, supercritical fluid fractionation; TAG, triacylglycerols; FFA, free fatty acids. See Table 1 for other abbreviations.

TABLE 3

Effect of $CO_2$ Flow Rate on the Extract
and Raffinate Composition[a,b]

| Flow rate (L/min) | TAG[c] | FFA[c] | Oryzanol[d] | Free sterol[d] | StE[d] |
|---|---|---|---|---|---|
| Extract | | | | | |
| 1.2 | 52.5[a] | 26.9[b] | 0.24[a] | 0.76[b] | 1.65[a] |
| 2.0 | 49.7[a] | 27.6[b] | 0.20[a] | 0.81[b] | 2.07[a] |
| Raffinate | | | | | |
| 1.2 | 73.2[b] | 4.9[a] | 1.35[b] | 0.28[a] | 3.55[b] |
| 2.0 | 75.0[b] | 4.2[a] | 1.30[b] | 0.27[a] | 4.74[c] |

[a]Fractionation experiments were carried out at 20.5 MPa and 45° C. for 180 minutes.
[b]The numbers in the same column with the same letter are not significantly different ($P > 0.05$).
[c]As HPLC area %.
[d]As w/w %. See Tables 1 and 2 for abbreviations.

TABLE 4

Composition of the Crude Rice Bran Oil and a Typical SFF
Raffinate Fraction Obtained at 138 Bar and 80° C.[1]

| Component | Crude RBO (%, w/w) | RBO SFF Raffinate Fraction (%, w/w) |
|---|---|---|
| FFA | 5 ± 0.6 | 2.5 ± 0.5 |
| St | 0.70 ± 0.05 | 0.50 ± 0.03 |
| StE | 2.6 ± 0.3 | 2.9 ± 0.4 |
| FE | 1.5 ± 0.3 | 4.9 ± 0.04 |

[1]FFA = Free fatty acids, St = Free phytosterols, StE = Fatty acid esters of phytosterols, FE = Ferulic acid esters of phytosterols (oryzanol)

We claim:

1. A method for reducing the level of fatty acids and enriching the level of phytosterols and/or phytosterol esters in a source of triglycerides containing said phytosterols and phytosterol esters, the method comprising:
   a. passing said source through a first series of pressurized column zones having a thermal gradient in the presence of a solvent that exists as a supercritical fluid in at least a portion of said gradient;
   b. removing an extract enriched in free fatty acids from the zone having the highest temperature within said gradient;
   c. passing a phytosterol- and/or phytosterol ester-enriched raffinate from the zone having the lowest temperature within said thermal gradient to a second series of pressurized column zones having a thermal gradient in the presence of a solvent that exists as a supercritical fluid in at least a portion of said gradient; and
   d. removing a phytosterol- and/or phytosterol ester-enriched triglyceride from the zone having the highest temperature within said thermal gradient.

2. The method of claim 1, wherein said source of triglycerides is an oil selected from the group consisting of rice bran oil, corn fiber oil, soybean oil, safflower oil and vegetable oil deodorizer distillates.

3. The method of claim 1, wherein said source of triglycerides also contains oryzanol.

4. The method of claim 1, wherein the pressure in said first pressurized column is within the range of 1500–2500 psi.

5. The method of claim 1, wherein the pressure in said second pressurized column exceeds 3000 psi.

6. The method of claim 1, wherein the thermal gradient in the first and second pressurized columns is at least about 40° C.

7. The method of claim 1, wherein the thermal gradient in the first and second pressurized columns is at least about 50° C.

8. The method of claim 1, wherein the thermal gradient in the first and second pressurized columns ranges from about 40° C. to about 90° C.

9. The method of claim 1, wherein said solvent is selected from the group consisting of carbon dioxide, fluorocarbon, ethylene and propane.

10. The method of claim 1, wherein said solvent is carbon dioxide.

11. The method of claim 1, wherein first series of pressurized column zones is in a first column, and the second series of pressurized column zones is in a second column.

12. The method of claim 11, wherein said zone having the highest temperature in step (b) is at the top of said first column.

13. The method of claim 11, wherein said zone having the lowest temperature within said thermal gradient in step (c) is at the bottom of said first column.

14. The method of claim 11, wherein said zone having the highest temperature in step (d) is at the top of said second column.

15. The method of claim 1, wherein said solvent is passed countercurrent to compounds condensing within higher temperature zones within the temperature gradient of said first or second series of pressurized column zones.

* * * * *